Patented May 1, 1923.

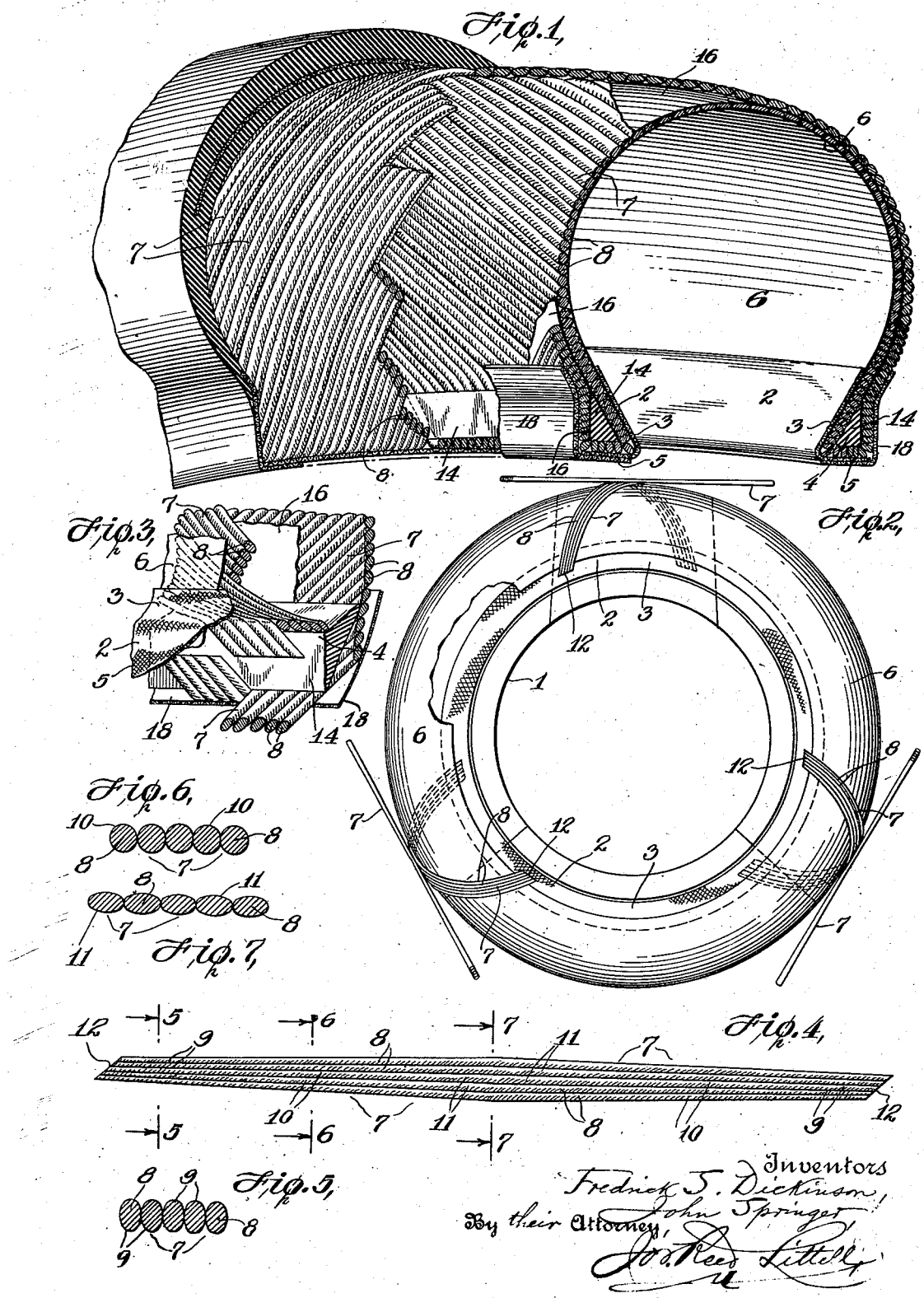

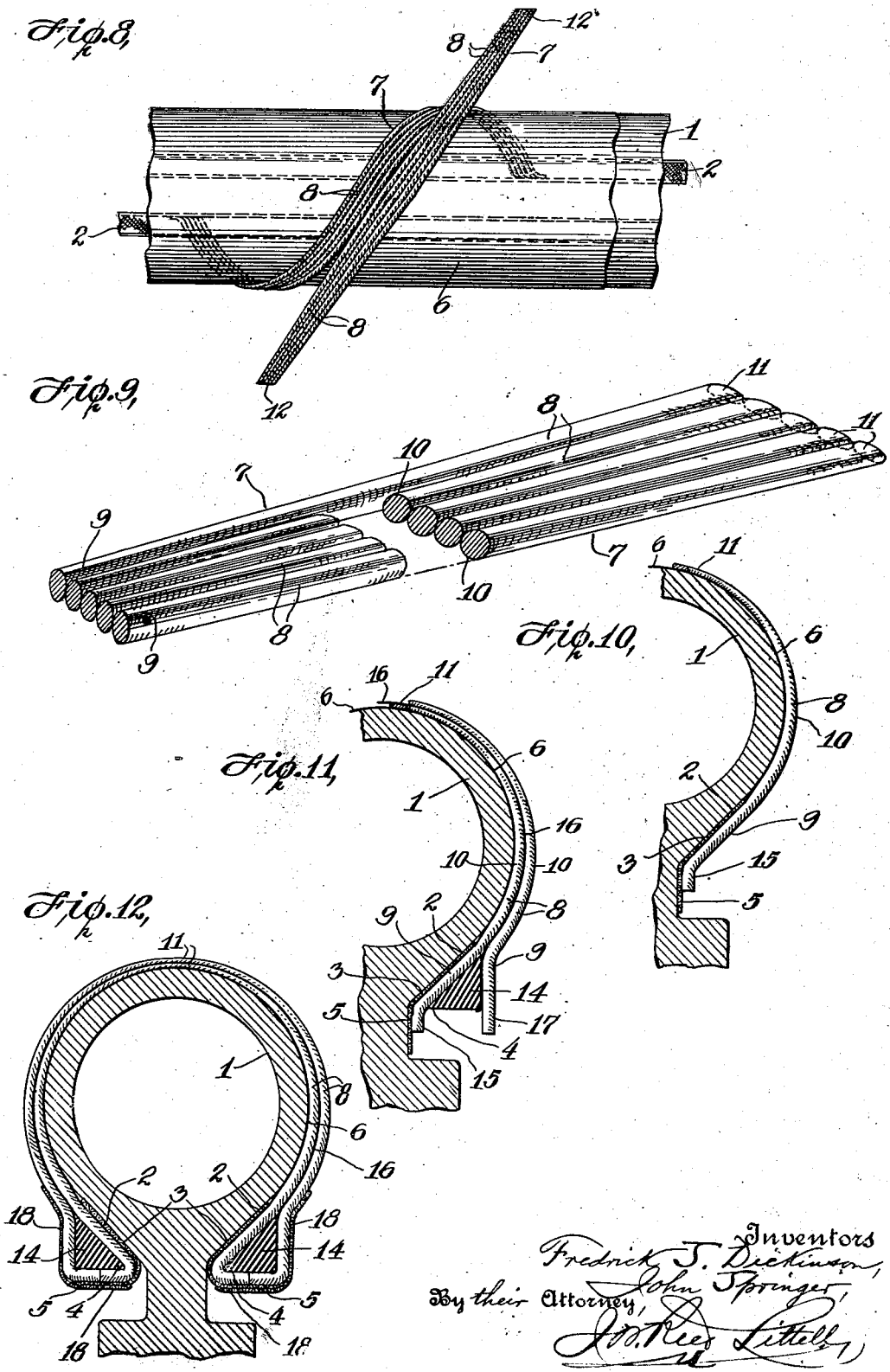

1,453,865

UNITED STATES PATENT OFFICE.

FREDRICK S. DICKINSON, OF NEW YORK, N. Y., AND JOHN SPRINGER, OF ATLANTIC HIGHLANDS, NEW JERSEY, ASSIGNORS TO SAID DICKINSON.

METHOD OF CONSTRUCTING PNEUMATIC TIRES.

Application filed May 8, 1919. Serial No. 295,660.

*To all whom it may concern:*

Be it known that we, FREDRICK S. DICKINSON, a resident of New York, in the county and State of New York, and JOHN SPRINGER, a resident of Atlantic Highlands, in the county of Monmouth and State of New Jersey, both citizens of the United States, have invented certain new and useful Improvements in Methods of Constructing Pneumatic Tires, of which the following is a specification.

This invention relates to methods of constructing pneumatic tires such as are now commonly used upon the wheels of automobiles and other vehicles and which comprise an elastic shoe or casing constituting the outer portion and tread of the tire and enclosing the inner air tube and having an internal body fabric or carcass formed by cords or threads.

Our invention has particular relation to the method of constructing the body fabric or carcass for such tires, to produce an improved carcass of the "cord" type.

In the heretofore accepted practice or method in the manufacture of such carcasses whether of the single cord or "thread-fabric" type, no effective provision is made for attaining equality of tension in the laid cords or threads or for effectively maintaining such variable tension as is sometimes attained. The imperfect condition of tension thus resulting creates such differences of action in the many cords or threads which constitute the carcass that, under the flexing or bending which ensuses from depression under load, frictional movements occur between the cords or threads and produce a degree of heat sufficient to over-vulcanize the rubber elements embodied in the tire and thereby destroy the life of the rubber to an extent which causes early deterioration, and there then follows a severance of all bonds between the individual cords or between the respective plies of the carcass and a consequent separation between the cord carcass and the rubber body of the shoe or casing which constitutes the outer portion and tread of the tire. Furthermore, under such conditions of unequal tension, the cords or strands in which the tension is greatest are subject to all maximum strains or stresses in the use of the tire and therefore have to bear the brunt of service, in which circumstances the loads are distributed over only a few cords instead of being borne equally by all the cords constituting the carcass.

The object of our present invention is to overcome the disadvantages and objectionable conditions as above set forth and to provide an improved method of construction whereby uniform desired conditions of tension will be effectively maintained throughout the entire cord fabric carcass, which will produce a tire structure of superior strength and durability, and which will enable a more economical and rapid manufacture of the cord carcass of the class to which our invention relates.

In the drawings—

Figure 1 is a perspective view, partly in section, illustrating a portion of a tire having two plies of cord laid according to our invention.

Fig. 2 is a side view showing the core or mandrel and illustrating the laying of the strips of cords thereon.

Fig. 3 is a detail perspective view, partly in section, illustrating the laid position of the strips of cords at the bead-edge construction.

Fig. 4 is a plan view of one of the strips or units made up of a plurality of cords, as employed in our present method.

Fig. 5 is a detail cross-section, on an enlarged scale, taken on the line 5—5, Fig. 4.

Fig. 6 is a detail cross-section, on an enlarged scale, taken on the line 6—6, Fig. 4.

Fig. 7 is a detail cross-section, on an enlarged scale, taken on the line 7—7, Fig. 4.

Fig. 8 is a plan view of the periphery of a portion of the core or mandrel over which the cord strips are laid and illustrating the position of said strips initially and in completed laid position.

Fig. 9 is a detail perspectve view, on an enlarged scale and partly in section, illustrating a half-portion of one of the cord strip units.

Fig. 10 is a detail cross-section through the core or mandrel and illustrating the initial lay of the cord of the first ply at the bead-edge portion.

Fig. 11 is a detail cross-section through the core or mandrel and illustrating the initial laid position of the cords of superposed plies and the insertion of the bead-ring at the bead-edge portion.

Fig. 12 is a detail cross-section through the core or mandrel and illustrating the final complete lay of the cords of superposed plies over the core and in the completed bead-edge construction.

Corresponding parts in all the figures are denoted by the same reference characters.

In carrying out the method of constructing the cord body fabric, as comprised in our present invention, the cords are laid over a suitable core or mandrel, 1, constituting a former, which is annular and has a cross-sectional contour corresponding to the desired inner cross-sectional contour of the tire shoe or casing. In practice, said annular core is made up of sections or segments adapted to be separated so that the core can be readily removed from within the finished tire shoe or casing. The circumferential surface of the core is first coated with an adhesive, preferably a rubber cement, and there is then placed at opposite sides of the core, at points corresponding to what will be the inner bead portion of the tire casing, a strip of frictioned fabric, 2—2, which will adhere to the adhesive coating upon the core and be positionally maintained thereby. Said frictioned fabric strips extend annularly with relation to the core and are of a width sufficient to extend upwardly, as at 3, from the toe, indicated at 4, of the bead in the finished tire casing a suitable distance with relation to the bead-edge construction (say, in practice, approximately 1 inch) and a distance below the toe of the bead, as at 5, sufficient to fully cover the base of the bead in the final condition of construction. The lower depending portion 5 of the frictioned fabric strip is free and not in adhesive connection with the neck of the core. There is then placed over the core an envelope or covering, 6, having an adhesive quality, preferably uncured sheet rubber, which will adhere to the adhesive coating of the core and will itself constitute an adhesive element. This covering extends over the circumferential surface of the core. The cords are then laid over the rubber-covered core under the conditions and in the manner hereinafter described.

In our present invention, the cord carcass is constituted by a plurality of strip units, 7, each consisting of a plurality of cords, 8, assembled together side by side. Any suitable number of cords may be employed in each strip unit, but preferably we employ five cord lengths as herein shown (Figs. 4, 8 and 9), it being understood that the width of the strip unit is limited in its relation to the area of the variable circumference of the core or former which is to be covered by the unit in the laying of the strips obliquely over the core side by side so that they effectively cover the entire area of the variable circumference thereof. Each of said strip units is first produced in the shape and condition hereinafter described, and the plurality of cord lengths constituting the unit are rubber treated so that they have an adhesive quality and maintain the shape and assembled construction in which the unit is produced. In the completed cord strip unit, the assembled plurality of cord lengths are each respectively formed so that at the terminal ends at the bead-edge portion the cords are flattened, as at 9 (Figs. 5 and 9), the narrow diameter of said flattened ends being at right angles to the annulus of the tire, and from said flattened end portions the cords gradually and progressively merge into a true cylindrical cross-section, as at 10 (see Figs. 6 and 9), at the side portions above the bead, and from said cylindrical side portions the cords again gradually merge into a flattened central portion, as at 11 (see Figs. 7 and 9), in which the narrow diameter is at right angles to the narrow diameter of the flattened end portions 9 and is in the plane of the annulus of the tire, said flattened central portions 11 being at the peripheral or tread portion above the sides. The cord lengths are initially of cylindrical cross-section throughout their length, and are compressed to impart the variable contour as just described in the process of producing the cord strip unit, which may be done by any adapted apparatus or means, and the cohesion of the cord lengths in this contour is thereafter maintained. The completed strip unit is therefore wider at its central or tread portion 11 and gradually narrows to its intermediate or side portions 10—10 and to their terminal ends 9—9 at the bead, which ends are cut at a corresponding acute angle, as at 12, which will conform to the annular line of the bead when the cord strips are laid in their oblique position. As will be understood from the foregoing description, each strip unit 7 is so formed that it will cover accurately and at all points the proportional surface area of the core from the bead base, and thus in the formation of each strip unit compensation is provided for the increasing progressive variable circumference from the bead-edge to the tread throughout the entire path in which the strip is laid or positioned.

The cord strip units are of such predetermined length that they will extend over the core, at the desired oblique or diagonal angle of lay, from a point on one side corresponding to the point of the bead-toe contact 4 to a corresponding point on the opposite side of the core, with sufficient additional length at each end of the strip to permit said ends to be laid under the bead-ring part way (say one-half) across its base, due calculation being further provided in the length of the strip to compensate for the degree of stretch to be imparted to it under the conditions of tension in which it is laid.

The cord strip units are laid over the core or former side by side until the full circumferential area of the annular core at the sides and tread is entirely covered. In the act of laying, the strips are first placed across the periphery of the core in plane therewith and at an angle thereto, as indicated by the first position illustrated in Figs. 2 and 8, and the end portions of the strip are then brought downwardly over the sides of the core and to contact with the frictioned fabric strips 2—2, at the bead-edge portion, in the oblique or diagonal final position as illustrated in Figs. 2 and 8, and are adhesively maintained in their laid position by the uncured sheet rubber covering 6 and the frictioned fabric strips. This positional laying of the cord strip units may be effected by any suitable machine action or in any adapted manner.

The foregoing conditions as involved in our improved method, comprising the laying of a plurality of cord strip units each made up of a plurality of cord lengths and shaped so that in the oblique position of lay the cord unit will cover entirely and at all points the proportional surface area of the variable circumference of the core, the proportions and shape of each strip unit being predetermined with relation to the unit areas to be covered, enables the laying of the strip units simultaneously at a plurality of points on the core, and the method is thus adapted for very rapid and inexpensive conditions of manufacture. In laying the strip units simultaneously at a plurality of points, the respective starting strips are first placed at predetermined and equidistant points (which conditions are illustrated in Fig. 2), and the succeeding strips are then laid up simultaneously from each of said starting points until the full area of the core is covered. In this operation, it will be understood that the core is revolved in a progressive movement, in which the laying of the successive strip units simultaneously at the various starting points will progress uniformly, and the location of the several starting points is such that the uniform and progressive simultaneous laying of the strips between said points will finally cover accurately the full circumferential area between each of the starting strips at said separated points. However, if preferred, and within the compass of our method, the cord strip units may be laid and positioned starting from a single point and with a single strip and from thence laying the strips successively and singly as the core advances in its revoluble movement until the full area of the core is covered and the final laid strip terminates at the side of the initial starting strip, which conditions of the successive lay of the strips side by side is indicated in Fig. 8.

The conditions of uniform tension which are enabled by our improved method are an important feature of the invention. In laying the cord units in the manner before described, the strips are stretched over the core to a condition of uniform tension in each and all of the strips, which uniform tensional lay may be effected by any suitable machine action or in any adapted manner, and the tensioned conditions of lay are maintained by the adhesive quality of the rubber covering 6 on the core and the frictioned fabric strips 2. This tensioned condition in uniform degree is effected in each cord strip unit as they are successively laid and is maintained in the progressive laying operation until the full area of the core is covered by the strips, for which purpose there may be additionally employed suitable clamping mechanism which will come into operation successively at the bead-edge portion of the strips as each strip is laid and will have a positive action to clamp the laid strip in its applied position on the core. When the strips are laid and tensioned as before described, the tensional condition is then permanently fixed by the application of the bead strip or member, 14, which is a reinforced annular ring of approximately triangular cross-section and of reinforced vulcanized rubber or other suitable material, the bead-ring being placed against the end portion of the cord strip units which contacts with the frictioned fabric strips 2, just above the terminal edge or end portion of the cord strips, which terminal edge or end portion is folded or pressed back under the toe 4 of the bead and applied so that it adheres to the under portion or base of the bead and extends partly across the base in the steps of completing the laying of the cord carcass as will be hereinafter described.

The initial completed and tensioned lay of an under ply of the cord strips is illustrated in Fig. 10, in which the end portion 9 of the cord strip units is in adhesive connection with the upper portion 3 of the frictioned fabric strips 2 and extends a short distance beneath the point at which the bead-toe will come, as at 15. This laying of the cord strip units in position over the core as shown in Fig. 10 completes the initial lay of the underply of the cord fabric carcass, and in the provision of a two-ply carcass according to our method the second ply is then laid. Preliminary to the laying of the second ply, an envelope or covering, 16, having an adhesive quality, preferably uncured sheet rubber, and corresponding to the first envelope or covering 5 which is laid over the core, is placed over the first ply of the cord strip units and the bead-ring 14 is placed in position. The second ply constituted by the cord strip units is then laid over the rubber envelope or covering 16 in the same manner as to method of lay and tensioning as that hereinbefore described with reference to the laying of the first ply, the uniform tension and positional lay of the cord strips of the second ply being maintained by the adhesive quality of the rubber covering 16 and the end portion 9 of the cord strips of the second ply being laid against and in adhesive contact with the outer face of the bead-ring 14 and having the terminal edge or end, as at 17, projecting below the bead-ring a sufficient distance to be folded or pressed back and applied to cover approximately one-half of the under portion or base of the bead-ring, this initial positional and relative lay of the two plies being illustrated in Fig 11. In the lay of the second ply, the cord unit strips are laid at an angle or in oblique position opposite to the angle of lay or oblique position of the cord strips of the first ply, as shown in Fig. 1, the lay of the two plies thus being at reverse diagonal angles. It will be understood that the laying of the second ply of the cord strip units corresponds to that of the first ply in respect to uniformity of tension, the method of laying and positional relationship of the cord strips, and compensation for the increasing variable circumference which is covered at all points of the surface area by the strips which cover their correct proportional surface area.

When the initial lay of the two plies is completed as shown in Fig. 11, the respective terminal ends or edges 15 of the strips of the first ply and 17 of the strips of the second ply are then folded up or pressed back under the bead-ring so that they cover and adhere to the under or base portion thereof with the terminal end edges of the strips of the respective plies abutting, as shown in Fig. 12, and the free depending lower portion 5 of the frictioned fabric strips 2 is then turned upwardly against and across the folded or turned ends of the cord strips, which underly the bead-ring, and extends in adhesive connection therewith to the heel of the bead. A supplementary frictioned fabric strip, 18, which we term a "chafing strip" in its relation to the wheel rim, is then placed in position in contact with the underlying end of the frictioned fabric strip 2 and extends from the bead-toe end and around the bead-heel and upward against the outer surface of the second ply of cord strips to a point above the bead portion which will be above the contact surface of the rim-flange when the tire is in use. The final completed lay of the two plies of cord strip units, in which the frictioned fabric strips 2 and the chafing strips of frictioned fabric 18 operate to securely bind the cord strips in their positioned and uniform tensional lay and secure the bead construction, is illustrated in Fig. 12, and after the completion of the laying up of the cord carcass according to our method as shown in Fig. 12 the rubber body of the tire shoe or casing, consisting of the side walls, cushion stock, breaker strip and tread stock (as indicated in Fig. 1) is applied in the usual manner in this art and the casing is then vulcanized and finished and ready for commercial use under any of the usual or well-known processes.

It will be understood that our method is not limited to the production of the tire carcasses in any special number of plies, but is adapted for producing a carcass in any desired plurality of plies which may be laid successively according to the method. Nor is our method restricted to any particular mechanism or apparatus for carrying out by machine action the various steps involved, as machines of various types may be employed, particularly a machine for manufacturing tires according to the method constituting our present invention and which is the subject-matter of a separate application for patent.

It will also be understood that our improved method in its generic scope is not restricted to the laying of the cords in unitary strips each made up of a plurality of cord lengths, but that under some conditions as involved in the generic character of our improvements single lengths of cord may be laid to produce the cord fabric plies, according to the features of the method as set forth in our co-pending application for patent Serial No. 342,974, filed December 6, 1919.

We do not desire to be understood as limiting ourselves to the detail features of the method of construction as herein illustrated and described, as it is manifest that variations therein may be resorted to in the adaptation of the method of construction to varying conditions according to the type of pneumatic tire casing to which the cord body fabric as produced by our method is to be applied, without departing from the spirit and scope of our invention and improvements. We therefore reserve the right to all such variations and modifications as properly fall within the scope of our invention and the terms of the following claims.

Having thus described our invention, we claim and desire to secure by Letters Patent:

1. The method of constructing the internal body fabric for the shoe or casing of pneumatic tires, which comprises laying a plurality of cord strip units, each consisting of a plurality of cord lengths assembled together side by side, and in contact throughout their length over a core or mandrel in successive position and contact side by side, whereby the plurality of respective multiple cord strip units will collectively cover the surface area of the core and anchoring the ends of said strip units at the bead-edge.

2. The method of constructing the internal body fabric for the shoe or casing of pneumatic tires, which comprises laying a plurality of cord strip units, each consisting of a plurality of cord lengths assembled together side by side, and in contact throughout their length over a core or mandrel in successive position and contact side by side, whereby the plurality of respective multiple cord strip units will collectively cover the surface area of the core and anchoring the respective ends of said plurality of multiple cord strip units in contact with a frictioned fabric strip which is in secured position with relation to the core or mandrel.

3. The method of constructing the internal body fabric for the shoe or casing of pneumatic tires, which comprises laying a plurality of cord strip units, each consisting of a plurality of cord lengths assembled together side by side and in contact throughout their length, over a core or mandrel in successive position and contact side by side, each strip unit and cord length thereof being so shaped in cross-section that it will cover at all points the proportional surface area of the core between the opposite bead edges in a path oblique or diagonal to the annulus of the core and the strip units will collectively cover the complete annulus and thus compensate for the increasing progressive variable circumference from the bead-edge to the tread throughout the path in which the strip unit is laid.

4. The method of constructing the internal body fabric for the shoe or casing of pneumatic tires, which comprises laying over a core or mandrel in successive position side by side a plurality of cord strip units each consisting of a plurality of cord lengths assembled together side by side and having a cross-sectional contour which is flattened at the bead-edge portion with the narrow diameter of said flattened ends at right angles to the annulus of the tire and merging from said flattened ends into a cylindrical cross-section and from thence merging into a flattened central portion in which the narrow diameter is in the plane of the annulus of the tire, whereby each strip unit will cover at all points the proportional surface area of the core from the bead base and compensate for the increasing progressive variable circumference from the bead-edge to the tread throughout the path in which the strip is laid.

5. The method of constructing the internal body fabric for the shoe or casing of pneumatic tires, which comprises simultaneously laying over a core or mandrel in successive position side by side from a plurality of equi-distant starting points on the annulus of the core, a plurality of cord strip units each consisting of a plurality of cord lengths assembled together side by side and so shaped in cross-section that each strip unit will cover at all points the proportional surface area of the core from the bead base and compensate for the increasing progressive variable circumference from the bead-edge to the tread throughout the path in which the strip is laid.

6. The method of constructing the internal body fabric for the shoe or casing of pneumatic tires, which comprises laying in oblique or diagonal position over a core or mandrel and in successive position side by side a plurality of cord strip units, each consisting of a plurality of cord lengths assembled together side by side, having their greatest width at the central portion and from thence gradually tapering in width to their end portions, whereby each strip unit will cover at all points the proportional surface area of the core from the bead base and compensate for the increasing progressive variable circumference from the bead-edge to the tread throughout the path in which the strip is laid.

7. The method of constructing the internal body fabric for the shoe or casing of pneumatic tires, which comprises laying in oblique or diagonal position over a core or mandrel and in successive position side by side a plurality of cord strip units, each consisting of a plurality of cord lengths assembled together side by side, having a flattened greatest width at the central portion and from thence tapering in width to the end portions and gradually merging from said central portion into flattened end portions having their narrow diameter at right angles to the narrow diameter of the flattened central portion, whereby each strip unit will cover at all points the proportional surface area of the core from the bead base and compensate for the increasing progressive variable circumference from the bead-edge to the tread throughout the oblique path in which the strip is laid.

8. The method of constructing the internal body fabric for the shoe or casing of pneumatic tires, which comprises laying a plurality of cord strip units, each consisting of a plurality of cord lengths assembled together side by side, and in contact throughout their length over a core or mandrel in successive position and contact side by side, whereby the plurality of respective multiple cord strip units will collectively cover the surface area of the core, turning the respective end of said plurality of multiple cord strip units at an angle to their main laid portion, and anchoring the turned ends of said strip units at the bead-edge.

9. The method of constructing the internal body fabric for the shoe or casing of pneumatic tires, which consists in laying a plurality of cord units, each consisting of a plurality of cord lengths assembled together side by side, and in contact throughout their length, over a core or mandrel in successive position and contact side by side, whereby the plurality of respective multiple cord strip units will collectively cover the surface area of the core, anchoring the respective end portions of said plurality of multiple cord strip units in contact with a frictioned fabric strip which is in secured position with relation to the core or mandrel, turning the ends of the strip units beyond said anchor at an angle to their main laid portion, and then turning a portion of the frictioned fabric strip under the turned ends of the collective multiple cord strip units to anchor the same at the bead-base.

10. The method of constructing the internal body fabric for the shoe or casing of pneumatic tires, which consists in laying a plurality of cord strip units, each consisting of a plurality of cord lengths assembled together side by side, and in contact throughout their length over a core or mandrel in successive position and contact side by side, whereby the plurality of respective multiple cord strip units will collectively cover the surface area of the core, then inserting a bead ring or member against the end portions of the collective multiple cord strip units, then turning the respective ends of said multiple cord strip units under the base of the bead, and then anchoring said turned ends to the bead ring.

11. The method of constructing the internal body fabric for the shoe or casing of pneumatic tires, which comprises laying a plurality of cord strip units, each consisting of a plurality of cord lengths assembled together side by side and in contact throughout their length, over a core or mandrel in successive position and contact side by side, each strip unit and cord length thereof being so shaped in cross-section that it will cover at all points the proportional surface area of the core between the opposite bead edges in a path oblique or diagonal to the annulus of the core and the strip units will collectively cover the complete annulus and thus compensate for the increasing progressive variable circumference from the bead-edge to the tread throughout the path in which the strip unit is laid, producing conditions of relative tension in each of said cord strip units and each cord length thereof as it is positioned over the core or mandrel, and thereafter maintaining such tensional lay, whereby a uniform tensioned status is established and maintained in the complete body fabric made up of said cord strip units.

12. The method of constructing the internal body fabric for the shoe or casing of pneumatic tires, which comprises first forming respective cord strip units each consisting of a plurality of cord lengths assembled together side by side and in contact throughout their length and positionally maintained adhesively and so shaped in cross-section that each strip unit will cover at all points without twisting of the cords of the unit the proportional surface area of the tire section from the bead base and compensate for the increasing progressive variable circumference from the bead-edge to the tread throughout the path in which the strip is laid, and then laying a plurality of said strip units over a core or mandrel in successive position and contact side by side whereby the plurality of respective multiple cord strip units will collectively cover the surface area of the core.

13. The method of constructing the internal body fabric for the shoe or casing of pneumatic tires, which comprises first forming cord strip units each consisting of a plurality of cord lengths assembled together side by side and positionally maintained adhesively and having a cross-sectional contour which is flattened at the bead-edge portion with the narrow diameter of said flattened ends at right angles to the annulus of the tire and merging from said flattened ends into a cylindrical cross-section and from thence merging into a flattened central portion in which the narrow diameter is in the plane of the annulus of the tire, whereby each strip unit will cover at all points the proportional surface area of the core from the bead base and compensate for the increasing progressive variable circumference from the bead-edge to the tread throughout the path in which the strip is laid, and then laying a plurality of said strip units over a core or mandrel in successive position side by side.

14. The method of constructing the internal body fabric for the shoe or casing of pneumatic tires, which consists in laying a plurality of cord strip units, each consisting of a plurality of cord lengths assembled together side by side, and in contact throughout their length in an oblique or diagonal position over a core or mandrel and successively in contact side by side, whereby the plurality of respective multiple cord strip units will collectively cover the surface area of the core then laying over said first ply lay a corresponding plurality of multiple cord strip units in an oblique or diagonal position reverse to that of the underlying lay, and anchoring the ends of the strip units of both ply lays at the bead-edge.

15. The method of constructing the internal body fabric for the shoe or casing of pneumatic tires, which consists in laying a plurality of cord strip units, each consisting of a plurality of cord lengths assembled together side by side, in an oblique or diagonal position over a core or mandrel and successively side by side and anchoring the ends of said strip units in contact with a frictioned fabric strip which is in secured position with relation to the core or mandrel, then placing a bead ring or member against the end portions of said laid strip units, then laying over said first ply lay a corresponding plurality of cord strip units in an oblique or diagonal position reverse to that of the underlying lay and with their end portions against the outer face of the bead ring, then turning the ends of the strip units of said respective superposed lays in reverse directions under the base of the bead ring, then turning a portion of said frictioned fabric strip under said turned ends, and then applying a supplementary anchoring frictioned fabric strip extending beneath the base of the bead portion and the outer face of the end portions of the strip units of the outer ply lay.

In testimony whereof we have signed the foregoing specifications.

FREDRICK S. DICKINSON.
JOHN SPRINGER.